(12) United States Patent
Shenaq et al.

(10) Patent No.: US 10,288,246 B1
(45) Date of Patent: May 14, 2019

(54) VEHICLE HEADLAMP ASSEMBLY (71) Applicant: Ford Global Technologies, LLC, Dearborn, MI (US)

(72) Inventors: Mohammed Shenaq, Dearborn, MI (US); Mustafa Ahmed, Canton, MI (US); Sudip Sankar Bhattacharjee, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/866,827

(22) Filed: Jan. 10, 2018

(51) Int. Cl.
*B60Q 1/04* (2006.01)
*F21S 41/29* (2018.01)
*F21S 41/25* (2018.01)

(52) U.S. Cl.
CPC .......... *F21S 41/295* (2018.01); *B60Q 1/0408* (2013.01); *B60Q 1/0491* (2013.01); *F21S 41/25* (2018.01)

(58) Field of Classification Search
CPC ...... F21S 41/295; F21S 41/25; B60Q 1/0408; B60Q 1/0491
See application file for complete search history.

(56) References Cited

U.S. PATENT DOCUMENTS

| 4,802,068 | A | * | 1/1989 | Mokry | F21V 31/03 362/547 |
|---|---|---|---|---|---|
| 6,450,676 | B2 | | 9/2002 | Maeda et al. | |
| 7,040,793 | B2 | | 5/2006 | Chase | |
| 7,452,112 | B2 | | 11/2008 | Arlon | |
| 7,967,488 | B2 | | 6/2011 | Bae | |
| 9,302,610 | B2 | | 4/2016 | Sipido et al. | |
| 2011/0032720 | A1 | * | 2/2011 | Chen | B60Q 1/076 362/516 |
| 2011/0210579 | A1 | * | 9/2011 | Marur | B60N 2/42709 296/187.03 |
| 2016/0362042 | A1 | * | 12/2016 | Ovenshire | B60Q 1/0076 |

FOREIGN PATENT DOCUMENTS

| DE | 10062735 A1 | 6/2002 |
| JP | 2004349094 A | 12/2004 |

* cited by examiner

*Primary Examiner* — Donald L Raleigh
(74) *Attorney, Agent, or Firm* — Frank A. MacKenzie; Bejin Bieneman PLC (57) ABSTRACT

A vehicle headlamp assembly is generally shown. The headlamp assembly includes a housing, and a lens supported by the housing. The headlamp assembly includes a connecting member connected to the housing between the housing and the lens. The connecting member extends circumferentially about the housing. The connecting member is a different type of material than the housing and the lens, and the connecting member is deformable relative to the housing.

19 Claims, 8 Drawing Sheets

VEHICLE HEADLAMP ASSEMBLY

BACKGROUND

A vehicle may include at least one headlamp assembly. The headlamp assembly may include a lighting element for illuminating the environment ahead of the vehicle. The headlamp assembly may be attached to a front of the vehicle in a variety of ways. The attachment between the headlamp assembly and the vehicle may be specifically configured to achieve a variety of results.

Headlamp assemblies may be designed with a specified stiffness to account for impacts with objects, e.g., other vehicles, pedestrians, etc. However, the stiffness of the headlamp assembly may be greater than the stiffness of other components in the vehicle. Restriction in size of the headlamp assembly may increase the stiffness of the headlamp assembly. The stiffness of the headlamp assembly may affect impacts to a pedestrian's upper leg and a lower leg.

DETAILED DESCRIPTION

A vehicle headlamp assembly includes a housing, a lens supported by the housing, and a connecting member connected to the housing between the housing and the lens and extending circumferentially about the housing, the connecting member being a different type of material than the housing and the lens, and the connecting member being deformable relative to the housing.

The connecting member may extend continuously around a circumference of the housing.

The vehicle headlamp assembly may further include fingers connected to the housing between the housing and the lens, wherein the connecting member may include a plurality of segments in alternating arrangement with the fingers circumferentially about the housing.

The segments of the connecting member may be deformable relative to the fingers.

The segments of the connecting member may be formed of a different type of material than the fingers.

The fingers may be formed of the same type of material as the housing.

The fingers may include notches.

The vehicle headlamp assembly may further include a lighting element supported by the housing.

The housing may include a base and a support, and the connecting member may extend from the base to the support, and the lens may be connected to the support.

The base may be designed to attach to the vehicle.

The vehicle headlamp assembly may further include fingers connected to the housing and extending from the base to the support, wherein the connecting member may include a plurality of segments in alternating arrangement with the fingers circumferentially about the housing.

The segments of the connecting member may be deformable relative to the fingers.

The base and the support may be formed of the same material.

The fingers may be formed of the same material as the base and the support.

The fingers may extend from the base to the support in a substantially vehicle-longitudinal direction.

The housing may be formed of plastic and the connecting member may be formed of an elastomer.

The connecting member may be molded in the housing with a 2-shot injection molding.

A vehicle includes a vehicle component including a connector and a headlamp assembly including a housing, a lens supported by the housing, a receiver, and a connecting member connected to the housing between the housing and the lens and extending circumferentially about the housing, the connecting member being a different type of material than the housing and the lens, and the connecting member being deformable relative to the housing, wherein the connector engages the receiver.

The vehicle may further include fingers connected to the housing between the housing and the lens, wherein the connecting member may include a plurality of segments in alternating arrangement with the fingers circumferentially about the housing.

The housing may include a base and a support, the connecting member may extend from the base to the support, and the lens may be connected to the support.

With reference to the Figures, wherein like numerals indicate like parts throughout the several views, a vehicle headlamp assembly 26 is generally shown. The headlamp assembly 26 includes a housing 28, and a lens 38 supported by the housing 28. The housing 28 of the headlamp assembly 26 is includes an energy absorbing feature to absorb energy when the lens 38 is impacted. As examples, the energy absorbing feature may be a connecting member 40 (shown in FIGS. 2-4), a deformable adhesive 52 (shown in FIGS. 5B, 8A, and 8B), and a weakened line 34 (shown in FIGS. 6-8).

Figure 8A:
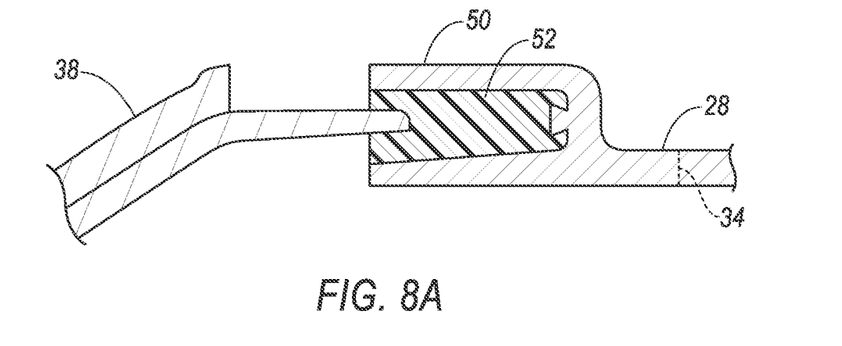
FIG. 8A is a detailed view of the headlamp assembly with the glue track and the plurality of notches being intact.
Figure 8B:
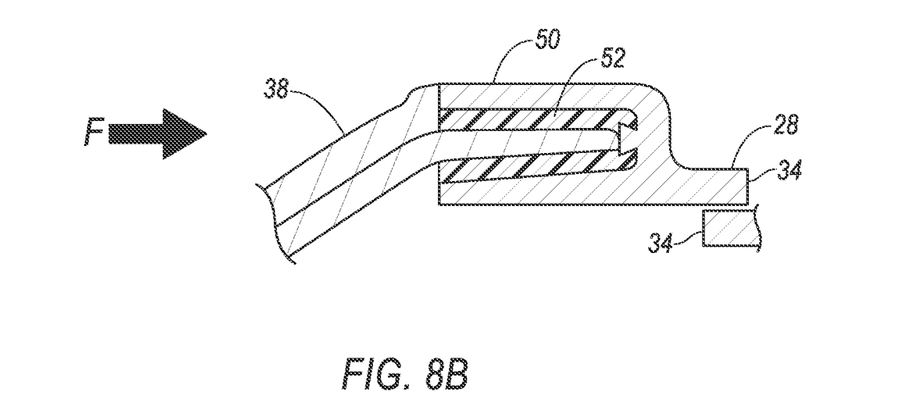
FIG. 8B is a detailed view of the headlamp assembly after the impact.

A vehicle impact may occur in a variety of different situations. For example, the vehicle impact may occur when a vehicle 20 is involved in a frontal collision with an object, e.g., barrier, pedestrian, another vehicle, etc. During the vehicle impact, a force F may be exerted on the headlamp assembly 26. The force F may traverse a portion of the headlamp assembly 26, e.g., the lens 38, the housing 28, etc., to the energy absorbing features. The energy absorbing feature is designed to allow the lens 38 to move rearwardly when subjected to a force F to absorb at least a portion of the force F. The force F on the headlamp assembly 26 may result from, e.g., an impact with a leg of a pedestrian during a pedestrian impact. When the energy absorbing feature absorbs the portion of the force F, the headlamp assembly 26 may impart a reduced impact force to the leg of the pedestrian. Furthermore, by increasing a package space in the headlamp assembly 26, the force F can be distributed over a greater area and can move the headlamp assembly 26 farther into the vehicle 20 prior to impact, reducing the impact force from the vehicle 20 to the pedestrian leg. The vehicle 20 may include one of the energy absorbing features described below. Alternatively, the vehicle 20 may include more than one of the energy absorbing features described below. For example, the vehicle 20 may include the deformable adhesive 52 and the weakened line 34, as shown in FIGS. 8A-8B. In another example, the vehicle 20 may include the connecting member 40 and the deformable adhesive 52.

Figure 1:
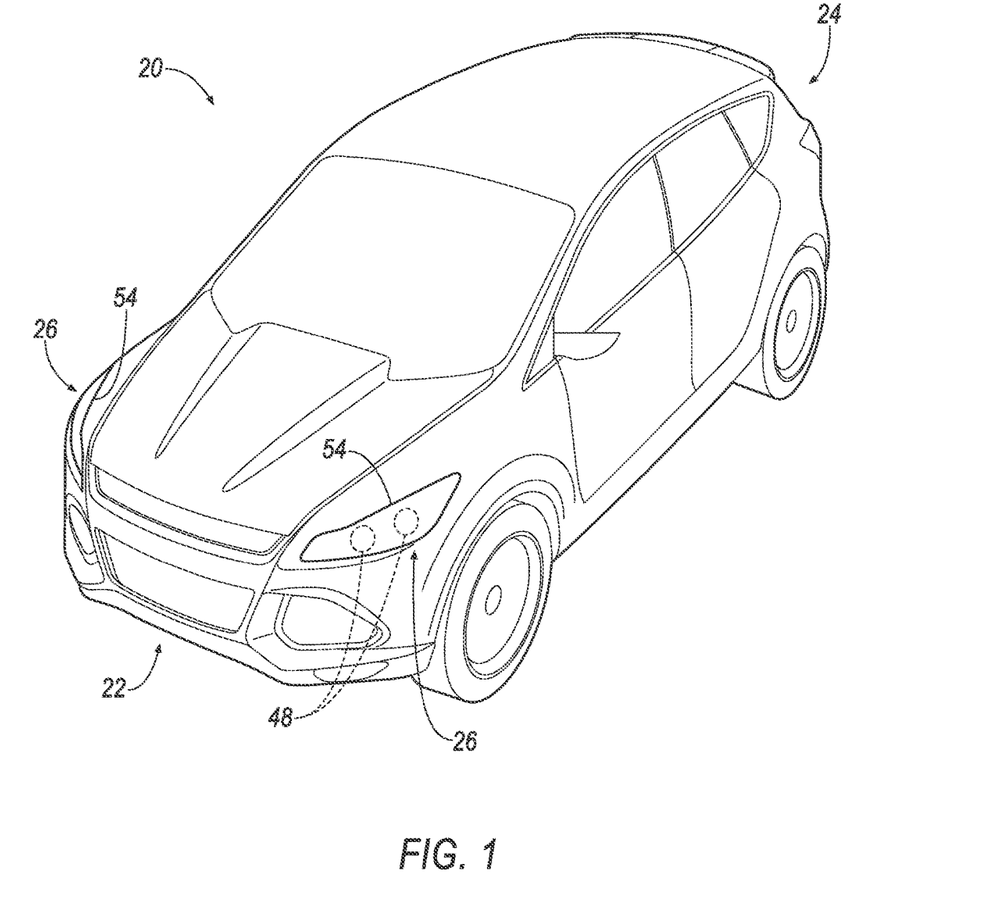
FIG. 1 is a perspective view of a vehicle.

As shown in FIG. 1, the vehicle 20 is generally shown. The vehicle 20 may be any suitable type of vehicle, e.g., an autonomous vehicle, a human-operated vehicle, etc. The vehicle 20 includes a front 22 and a rear 24 spaced from the front 22. The vehicle 20 includes the headlamp assembly 26 attached to a vehicle component 54 at or near the front 22. The vehicle component 54 may be any suitable component, such as, for example, a frame component, a body component, an engine component, etc. The vehicle component 54 may be a portion of a vehicle body. Alternatively, or in conjunction, the headlamp assembly 26 may be attached to the vehicle component 54 at or near the rear 24 (not shown in FIG. 1). As shown in FIG. 1, there may be two headlamp assemblies 26, or any suitable number of headlamp assemblies 26.

As shown in FIG. 1, the headlamp assembly 26 may include a lighting element 48 supported by the housing 28. The lighting element 48 may be a lightbulb or any suitable mechanism. The lighting element 48 may be any suitable type of lighting element, such as, for example, tungsten, tungsten-halogen, light-emitting diode (LED), high-intensity discharge (HID), etc. FIG. 1 shows two lighting elements 48 in the headlamp assembly 26, and the headlamp assembly 26 may include a suitable number of lighting elements 48.

The lens 38 is supported by the housing 28. The lens 38 may be at least partially transparent. For example, the lens 38 may be completely transparent to allow light to pass through the lens 38, the lens 38 may be partially transparent to allow only some light to pass through the lens 38, or the lens 38 may have areas of differing levels of transparency. The lens 38 may be tinted, i.e., the lens 38 may have a chromatic filter that permits specific wavelengths of light corresponding to a specific color, e.g., yellow, blue, red, etc.

The headlamp assembly 26 may be attached to the vehicle 20 in any suitable way. For example, the headlamp assembly 26 may be attached to the vehicle component 54. The vehicle component 54 may include a connector 56 and the housing 28 may include a receiver 58 that receives the connector 56, as described below and shown in FIGS. 7A-7B. As another example, in addition to or in the alternative to the connector 56, as shown in FIGS. 2-6, the housing 28 may include a plurality of attachment points 60. The attachment points 60 may be portions of the housing 28 that engage the vehicle 20 (e.g., the vehicle component 54) and may be arranged to receive a fastener, e.g., a bolt, a screw, a weld, etc. The attachment points 60 may be disposed in the support 32 closer to the front 22 than the connecting member 40, or the attachment points 60 may be disposed in the base 30 further from the front 22 than the connecting member 40. The headlamp assembly 26 may be attached to the vehicle 20 in any suitable configuration, including any combination of the previously described configurations.

The housing 28 may be plastic. Examples include polypropylene, acrylonitrile butadiene styrene, polyphenylene ether. Alternatively, the housing 28 may be any suitable material.

Figure 2:
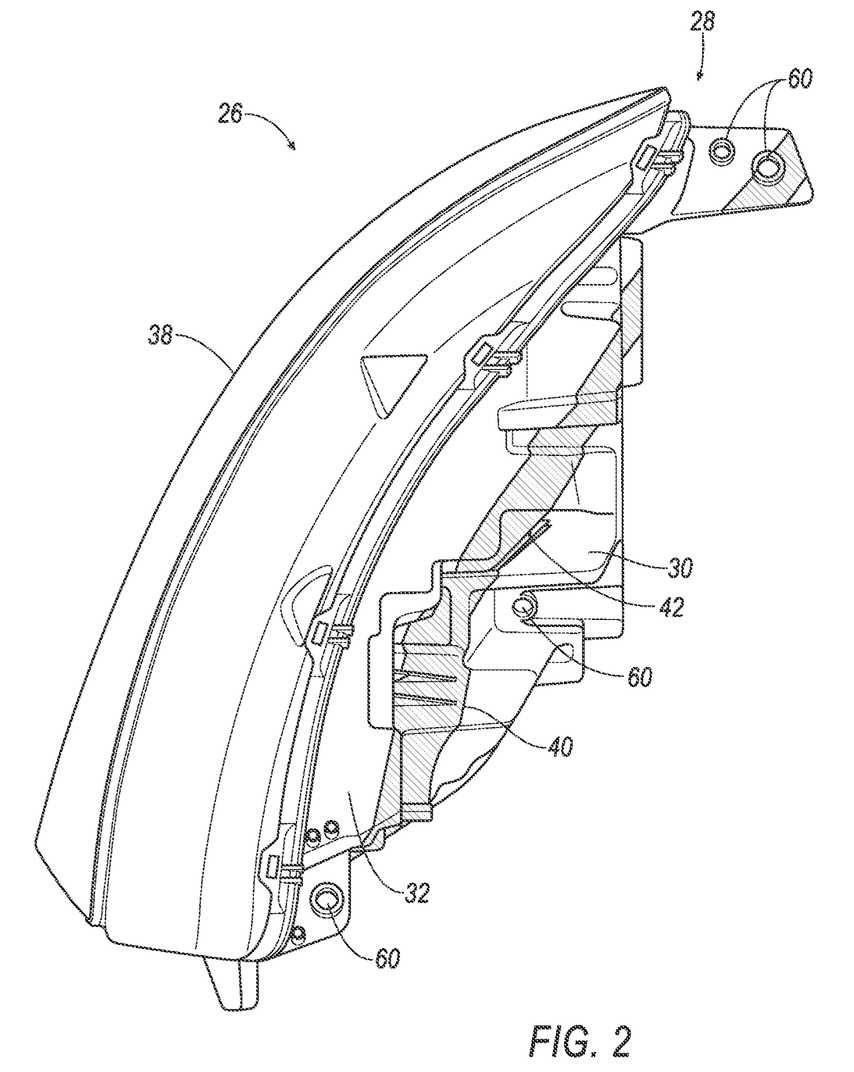
FIG. 2 is a perspective view of a vehicle headlamp assembly.
Figure 3:
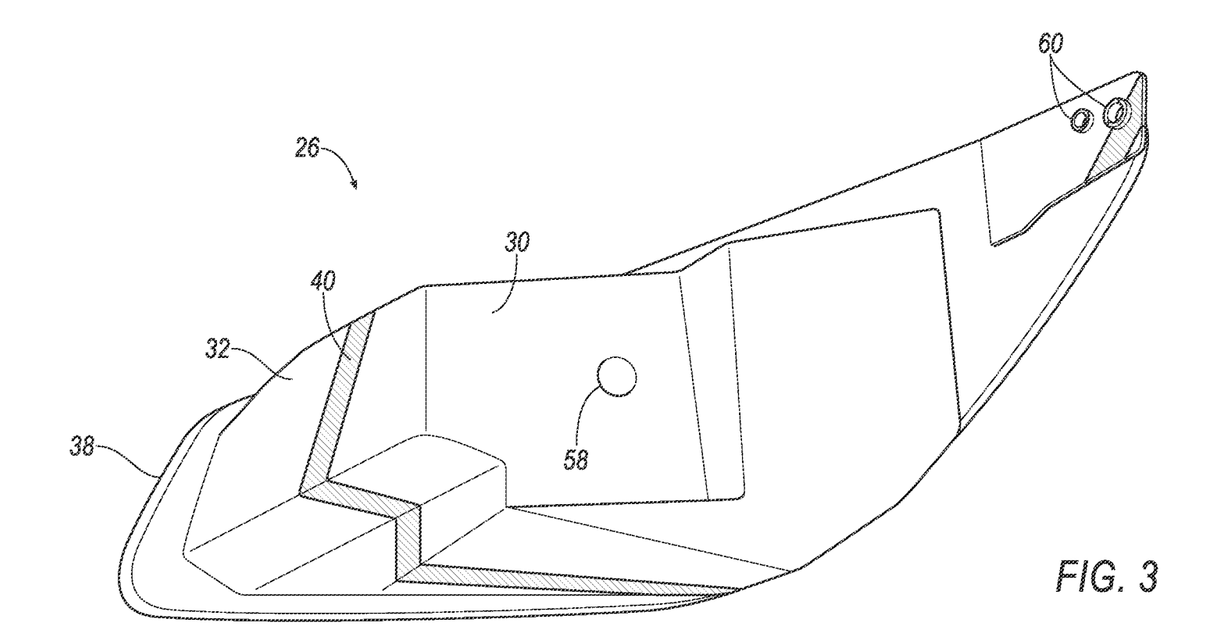
FIG. 3 is a rear view of the headlamp assembly.
Figure 4:
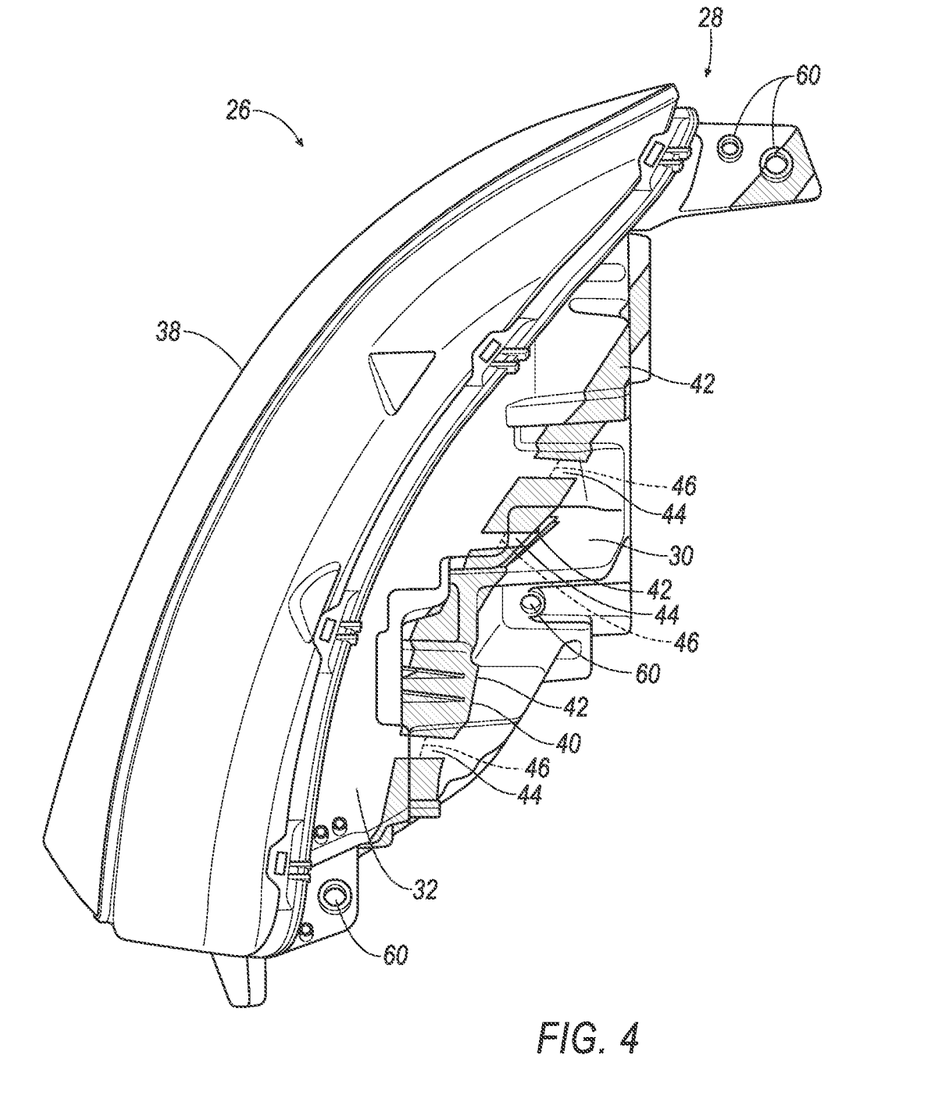
FIG. 4 is a perspective view of the headlamp assembly.

With reference to FIGS. 2-4, the headlamp assembly 26 may include the connecting member 40. The connecting member 40 is connected to the housing 28 between the housing 28 and the lens 38. The connecting member 40 extends circumferentially about the housing 28. The connecting member 40 is a different type of material than the housing 28 and the lens 38, and the connecting member 40 is deformable relative to the housing 28.

By being deformable relative to the housing 28, the connecting member 40 may absorb a portion of the force F. The configuration, material, etc., of at least the housing 28 and the connecting member 40 may be adjustable to achieve a desired result of compression, breakage, etc. The force F on the headlamp assembly 26 may result from, e.g., an impact with a leg of a pedestrian during a pedestrian impact. When the connecting member 40 absorbs the portion of the force F, the headlamp assembly 26 may impart a reduced impact force to the leg of the pedestrian.

With continued reference to FIGS. 2-4, the housing 28 may include a base 30 and a support 32. The connecting member 40 extends from the base 30 to the support 32 and the lens 38 is connected to the support 32. In other words, the base 30 and the support 32 may be spaced from each other and the connecting member 40 is disposed between the base 30 and the support 32, connecting the base 30 to the support 32. For example, the connecting member 40 may completely fill in a gap defined by the base 30 and the support 32, and the connecting member 40 may be continuously connected to the base 30 and the support 32 around the circumference of the housing 28. The connecting member 40 may be substantially flush with the housing 28, i.e., a material thickness of the connecting member 40 may be equal to a material thickness of the housing 28.

The connecting member 40 is deformable relative to the housing 28. In other words, when subjected to the force, e.g., during a pedestrian impact, the connecting member 40 deforms before the housing 28 deforms. The deformation of the connecting member 40 absorbs energy, as described above. The housing 28 provides a relatively rigid structure to resist deformation, for example, during normal operation of the vehicle 20. The connecting member 40 may be concealed behind the lens 38 and a portion of the housing 28 to avoid unintended deformation of the connecting member 40, i.e., in normal operating conditions. The degree of deformation of the connecting member 40 relative to the housing 28 may be dictated by a variety of factors, such as, size, shape, material, material thickness, etc. The connecting member 40, for example, may be formed of an elastomer, plastic, Thermoplastic Elastomer (TPE), Thermoplastic Olefin (TPO), Thermoplastic Polyurethane (TPU), Polyvinyl Chloride (PVC), Polyvinylpyrrolidone (PVO), Polyphenylene Oxide (PPO), Polyurethane (PU), etc., or any suitable material.

The housing 28 may be attached to the vehicle 20 via at least the base 30, the support 32, or the base 30 and the support 32. For example, the base 30 may be designed to attach to the vehicle component 54. The base 30 may include at least one receiver 58 and/or attachment point 60, which are described above.

As set forth above, the housing 28, i.e., the base 30 and the support 32, may be formed of plastic or any other suitable material. The base 30 and the support 32 of the housing 28 may be formed of the same material. Alternatively, the base 30 and the support 32 may be formed of different materials. As another example, the base 30 and the support 32 may be formed of combinations of any suitable materials.

As set forth above, the connecting member 40 extends circumferentially about the housing 28. In other words, the housing 28 has a circumference, and the connecting member 40 extends around the circumference. The connecting member 40 may extend continuously about the circumference, or may extend intermittently about the circumference, e.g., interposed with fingers 44 extending from the base 30 to the support 32 (as described below).

The connecting member 40 may be formed with the housing 28, i.e., the base 30 and the support 32, in a multi-injection molding process, e.g., 2-shot molding. In a multi-injection molding process, the base 30 and the support 32 may be formed by injecting material for the base 30 into the mold, injecting material for the support 32 into the mold, and injecting material for the connecting member 40 into the mold before the housing 28 and connecting member 40 are removed from the mold. By forming the housing 28 and the connecting member 40 in a multi-injection molding process, the base 30, the support 32, and the connecting member 40 may be constructed of multiple types of material with differing characteristics, e.g., tensile strength, deformation resistance, fracture resistance, weight, etc.

In the embodiment shown in FIG. 4, the headlamp assembly 26 may include the fingers 44 connected to the housing 28 between the housing 28 and the lens 38. During a vehicle frontal impact, the force F may be exerted on the front 22 of the vehicle 20. The force F may traverse a portion of the headlamp assembly 26, e.g., the lens 38, the housing 28, etc., to the connecting member 40. When the force F exceeds a threshold value, the fingers 44 may break, e.g., along the notches 46 to allow for movement of the support 32 relative to the base 30 as the connecting member 40 is deformed.

In such an example, the connecting member 40 includes a plurality of segments 42 in alternating arrangement with the fingers 44 circumferentially about the housing 28, i.e., around the circumference of the base 30. For example, each of the fingers 44 is between two adjacent segments 42, and each of the segments 42 is between two adjacent fingers 44, such that the segments 42 and the fingers 44 are in an alternating arrangement circumferentially about the housing 28.

The segments 42 of the connecting member 40 may be deformable relative to the fingers 44. For example, the degrees of deformation of the segments 42 of the connecting member 40 and the fingers 44 may be dictated by a variety of factors, such as, size, shape, material, material thickness, etc. For example, the segments 42 of the connecting member 40 may be formed of a different type of material than the fingers 44. For example, the fingers 44 may be formed of the same type of material as the housing 28, e.g., a plastic, and the segments 42 of the connecting member 40 may be formed of, for example, an elastomer.

The fingers 44 may have a substantially rectangular shape, or any suitable shape. The fingers 44 may extend from the base 30 to the support 32 in a substantially vehicle-longitudinal direction. The substantially vehicle-longitudinal direction spans from the front 22 of the vehicle 20 to the rear 24 of the vehicle 20.

Each finger 44 may include one or more notches 46. The notches 46 may be areas of material weakness, e.g., perforations, holes, thinner layers of material than surrounding areas, or any suitable configuration. The notches 46 may be configured to cause the fingers 44 to break along the notches 46 upon a force exceeding a threshold value acting upon the fingers 44. The threshold may be determined by, for example, impact testing.

With reference to FIGS. 5A-5B and 8A-8B, the headlamp assembly 26 may include deformable adhesive 52 between the lens 38 and the housing 28. The deformable adhesive 52 deforms upon application of the force F to the lens 38 to absorb energy from the lens 38 as the lens 38 moves relative to the housing 28. In the event of a pedestrian impact with the headlamp assembly 26, this reduces the impact force on the pedestrian. The lens 38 and the housing 28 may intersect at the deformable adhesive 52, and the lens 38 and the housing 28 may be joined together by the deformable adhesive 52. The deformable adhesive 52 may be of any suitable type, and is deformable relative to both the housing 28 and the lens 38, i.e., during application of the force F, the deformable adhesive 52 deforms before both the housing 28 and the lens 38. When the adhesive 52 deforms, at least a portion of the force F is absorbed by the deforming adhesive 52, and thus less of the force F is applied to the vehicle 20, reducing the impact to the pedestrian.

Figure 5A:
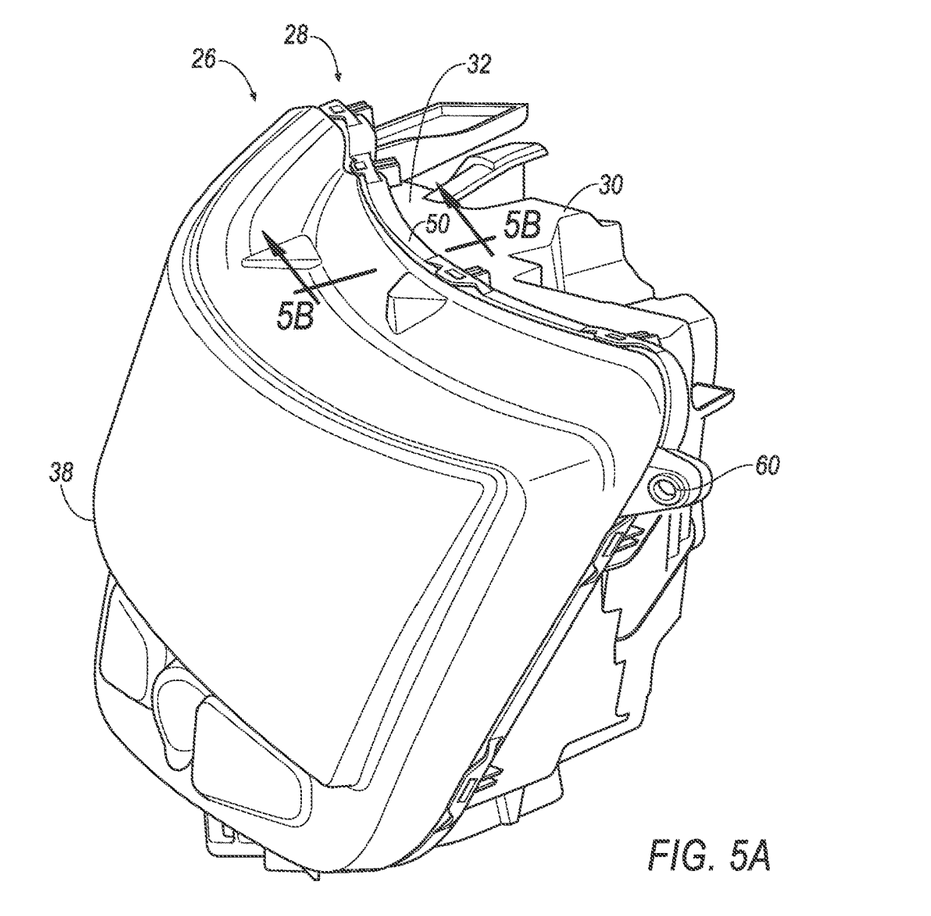
FIG. 5A is a perspective view of the headlamp assembly with a glue track.
Figure 5B:
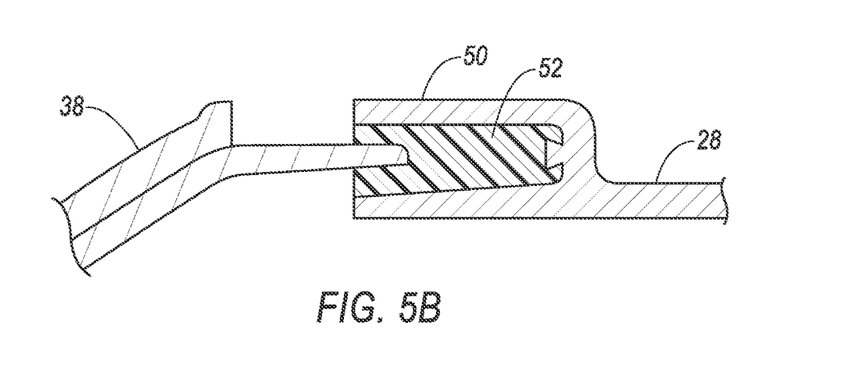
FIG. 5B is a detailed view of a portion of the glue track.
Figure 6:
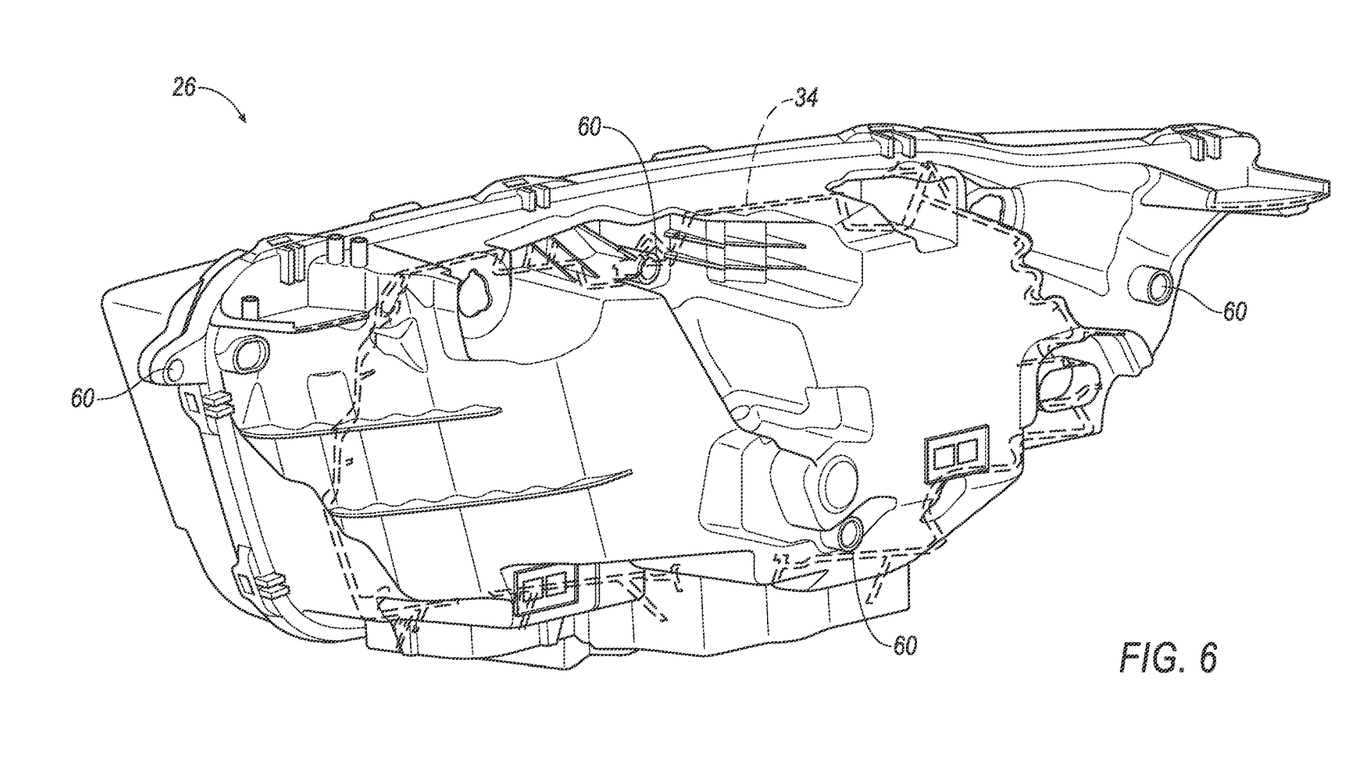
FIG. 6 is a perspective view of the headlamp assembly with a plurality of notches.
Figure 7A:
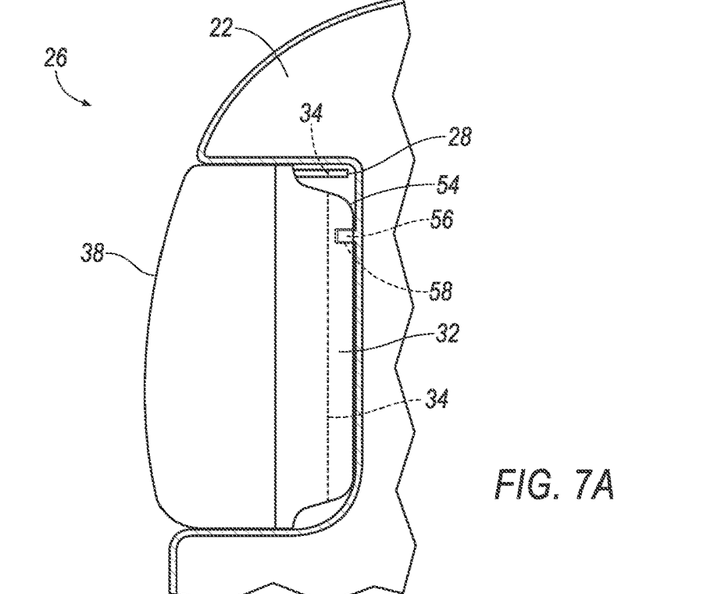
FIG. 7A is a schematic view of the headlamp assembly with the plurality of notches being intact.
Figure 7B:
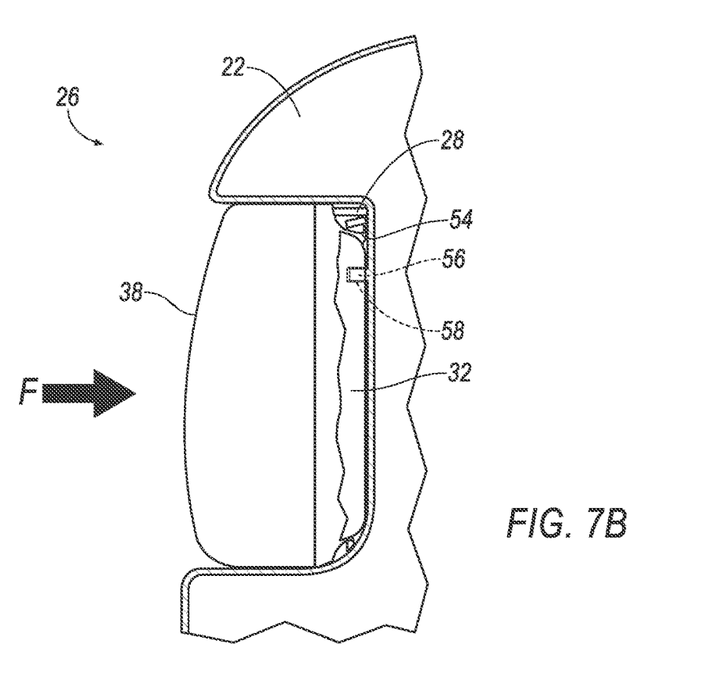
FIG. 7B is a schematic view of the headlamp assembly with the plurality of notches being broken after an impact.

At least one of the housing 28 and the lens 38 defines an adhesive track 50 that houses the deformable adhesive 52. For example, as shown in FIGS. 5B, 8A, and 8B, the housing 28 defines the adhesive track 50, and the lens extends into the adhesive track 50 to engage the deformable adhesive 52.

With reference to FIGS. 6-8B, the energy absorbing feature may be the weakened line 34 extending around a circumference of the housing 28. The weakened line 34 may be areas of material weakness, e.g., perforations, holes, thinner layers of material than surrounding areas, or any suitable configuration. The weakened line 34 may completely encircle the housing 28. For example, the weakened line 34 may be disposed between the base 30 and the support 32. The weakened line 34 may be configured to cause the housing 28 to break along the weakened line 34 upon a force exceeding a threshold value acting upon the housing 28. By extending the weakened line 34 around the housing 28, the portion of the housing 28 along the weakened line 34 may detach upon application of force exceeding the threshold value to absorb energy.

As shown in FIGS. 8A-8B, the headlamp assembly 26 may include both the deformable adhesive 52 and the weakened line 34. In such a configuration, during the vehicle impact, the lens 38 may move toward the housing 28, deforming the deformable adhesive 52 and breaking the weakened line 34. The lens 38 may deform the deformable adhesive 52 prior to breaking the weakened line 34 or, alternatively, the weakened line 34 may break prior to the lens 38 deforming the adhesive 52. The adhesive track 50, the adhesive 52, and the weakened line 34 may be designed to actuate in a specified order to customize mitigation of the force F.

Prior to a vehicle impact, as shown in FIGS. 2, 4, 5B, 7A, and 8A, the housing 28 is intact. After a vehicle impact, the lens 38 moves rearwardly relative to the vehicle component 54 and/or the housing 28 to absorb energy. For example, in the example shown in FIG. 2, the connecting member 40 deforms to allow the lens 38 and the support 32 to move rearwardly. In the example shown in FIG. 4, the fingers 44 and connecting member 40 deform to allow the lens 38 and the support 32 to move rearwardly. In the example shown in FIG. 5B, the deformable adhesive 52 is deformed to allow the lens 38 to move rearwardly relative to the housing 28 and the vehicle component 54. In the example, shown in FIGS. 7A-B, the weakened line 34 breaks to allow the lens 38 and the support 32 to move rearwardly. In the example, shown in FIGS. 8A-B, the weakened line 34 breaks and the deformable adhesive 52 deforms to allow the lens 38 and the support 32 to move rearwardly. Specifically, the force F forces the lens 38 rearwardly, building stress in the housing 28. Since the housing 28 is engaged with the vehicle component 54, the vehicle component 54 supplies a counteractive force to the force F. These counteracting forces act on the energy absorbing feature to absorb energy. In other words, the vehicle component 54 may be rigid relative to the housing 28. After the vehicle impact, at least a portion of the housing 28 may remain attached the vehicle component 54, e.g., connector 56 may remain engaged with the receiver 58.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle headlamp assembly comprising:
a housing;
a lens supported by the housing;
a connecting member connected to the housing between the housing and the lens and extending circumferentially about the housing, the connecting member being a different type of material than the housing and the lens, and the connecting member being deformable relative to the housing; and
fingers connected to the housing between the housing and the lens;
wherein the connecting member includes a plurality of segments in alternating arrangement with the fingers circumferentially about the housing.

2. The vehicle headlamp assembly of claim 1, wherein the connecting member extends continuously around a circumference of the housing.

3. The vehicle headlamp assembly of claim 1, wherein the connecting member is molded in the housing with a 2-shot injection molding.

4. The vehicle headlamp assembly of claim 1, wherein the segments of the connecting member are deformable relative to the fingers.

5. The vehicle headlamp assembly of claim 1, wherein the segments of the connecting member are formed of a different type of material than the fingers.

6. The vehicle headlamp assembly of claim 1, wherein the fingers are formed of the same type of material as the housing.

7. The vehicle headlamp assembly of claim 1, wherein the fingers include notches.

8. The vehicle headlamp assembly of claim 1, further comprising a lighting element supported by the housing.

9. The vehicle headlamp assembly of claim 1, wherein the housing includes a base and a support, the connecting member extending from the base to the support, and the lens being connected to the support.

10. The vehicle headlamp assembly of claim 9, wherein the base is designed to attach to the vehicle.

11. The vehicle headlamp assembly of claim 9, further comprising fingers connected to the housing and extending from the base to the support, wherein the connecting member includes a plurality of segments in alternating arrangement with the fingers circumferentially about the housing.

12. The vehicle headlamp assembly of claim 11, wherein the segments of the connecting member are deformable relative to the fingers.

13. The vehicle headlamp assembly of claim 11, wherein the base and the support are formed of the same material.

14. The vehicle headlamp assembly of claim 13, wherein the fingers are formed of the same material as the base and the support.

15. The vehicle headlamp assembly of claim 11, wherein the fingers extend from the base to the support in a substantially vehicle-longitudinal direction.

16. The vehicle headlamp assembly of claim 1, wherein the housing is formed of plastic and the connecting member is formed of an elastomer.

17. A vehicle, comprising:
a vehicle component including a connector; and
a headlamp assembly including:
a housing;
a lens supported by the housing;
a receiver;
a connecting member connected to the housing between the housing and the lens and extending circumferentially about the housing, the connecting member being a different type of material than the housing and the lens, and the connecting member being deformable relative to the housing; and
fingers connected to the housing between the housing and the lens, wherein the connecting member includes a plurality of segments in alternating arrangement with the fingers circumferentially about the housing;
wherein the connector engages the receiver.

18. A vehicle headlamp assembly comprising:
a housing including a base and a support;
a lens supported by the housing; and
a connecting member extending from the base to the support and extending circumferentially about the housing, the connecting member being a different type of material than the housing and the lens, and the connecting member being deformable relative to the housing;
wherein the housing is formed of plastic and the connecting member is formed of an elastomer.

19. A vehicle, comprising:
a vehicle component including a connector; and
a headlamp assembly including:
a housing including a base and a support;
a lens supported by the housing and connected to the support;
a receiver; and
a connecting member connected to the housing between the housing and the lens and extending circumferentially about the housing, the connecting member being a different type of material than the housing and the lens, and the connecting member being deformable relative to the housing;
wherein the connector engages the receiver and the connecting member extends from the base to the support.

* * * * *